(12) United States Patent
Liu et al.

(10) Patent No.: US 9,479,334 B2
(45) Date of Patent: Oct. 25, 2016

(54) METHOD, SYSTEM, AND TERMINAL FOR COMMUNICATION BETWEEN CLUSTER SYSTEM ENCRYPTION TERMINAL AND ENCRYPTION MODULE

(71) Applicant: ZTE CORPORATION, Shenzhen, Guangdong Province (CN)

(72) Inventors: Xiaojing Liu, Shenzhen (CN); Hui Yang, Shenzhen (CN); Zhenzhuo Zeng, Shenzhen (CN); Jiagen Zhou, Shenzhen (CN); Jinlei Zhang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 14/422,251

(22) PCT Filed: Aug. 15, 2013

(86) PCT No.: PCT/CN2013/081582
§ 371 (c)(1),
(2) Date: Mar. 20, 2015

(87) PCT Pub. No.: WO2014/026626
PCT Pub. Date: Feb. 20, 2014

(65) Prior Publication Data
US 2015/0200779 A1 Jul. 16, 2015

(30) Foreign Application Priority Data

Aug. 16, 2012 (CN) .......................... 2012 1 0291477

(51) Int. Cl.
*H04K 1/00* (2006.01)
*H04L 9/14* (2006.01)
*H04L 29/06* (2006.01)
*H04W 12/04* (2009.01)

(52) U.S. Cl.
CPC ................ *H04L 9/14* (2013.01); *H04L 63/04* (2013.01); *H04L 63/06* (2013.01); *H04L 63/08* (2013.01); *H04W 12/04* (2013.01); *H04L 2209/24* (2013.01)

(58) Field of Classification Search
None
See application file for complete search history.

(56) References Cited

U.S. PATENT DOCUMENTS

| | | | |
|---|---|---|---|
| 2004/0161086 A1* | 8/2004 | Buntin | ................ H04L 12/4633 379/189 |
| 2008/0013720 A1 | 1/2008 | Degele | |
| 2012/0151223 A1* | 6/2012 | Conde Marques | . G06F 21/6218 713/193 |

FOREIGN PATENT DOCUMENTS

| | | |
|---|---|---|
| CN | 101137123 A | 3/2008 |
| CN | 101651944 A | 2/2010 |
| CN | 101902734 A | 12/2010 |
| EP | 1376924 A2 | 1/2004 |

OTHER PUBLICATIONS

European Search Report dated Jun. 26, 2015 of European patent Application No. 13829674.4.

\* cited by examiner

*Primary Examiner* — Brandon Hoffman
(74) *Attorney, Agent, or Firm* — Plumsea Law Group, LLC (57) ABSTRACT

A method, system and terminal for communication between an encryption terminal and an encryption module in a cluster system are provided in the present document. The method includes: when it is required to make an encrypted call, a calling encryption terminal applying to a key management center for a key according to the type of the encrypted call; the calling encryption terminal and a called encryption terminal receiving working keys sent from the key management center, setting respective working states, and synchronizing the working keys and the working states to respective encryption modules; and the encryption module of the calling encryption terminal and the encryption module of the called encryption terminal respectively making an encrypted call by using the working keys. The system includes: a calling encryption terminal, a called encryption terminal and a key management center. The terminal includes: an applying module, a synchronization module and an encryption module.

8 Claims, 5 Drawing Sheets

METHOD, SYSTEM, AND TERMINAL FOR COMMUNICATION BETWEEN CLUSTER SYSTEM ENCRYPTION TERMINAL AND ENCRYPTION MODULE

CROSS-REFERENCE TO RELATED APPLICATION(S)

This application is the U.S. National Phase application of PCT application number PCT/CN2013/081582 having a PCT filing date of Aug. 15, 2013, which claims priority of Chinese patent application 201210291477.0 filed on Aug. 16, 2012, the disclosures of which are hereby incorporated by reference.

TECHNICAL FIELD

The present document relates to the field of communication technology, and particularly, to a method, system and terminal for communication between an encryption terminal and an encryption module in a cluster system.

BACKGROUND OF THE RELATED ART

A digital cluster system in a Code Division Multiple Access (CDMA) standard has already possessed the good security and confidentiality, but for industry users who have higher requirements on the confidentiality, such as security departments including army, government departments and so on, it is more expected to use encrypted digital clustering, and the involved services include: common voices, one-to-one single call, one-to-many group call, short messages and data services and so on. An encrypted digital cluster system based on the CDMA standard is one end-to-end communication system, and compared to a non-encrypted common communication system, the main difference is that an encryption module is attached to an encryption terminal, so as to support the function for encrypting and decrypting different services. However, the synchronization of working states between the encryption terminal and the encryption module cannot be well implemented in the related art.

SUMMARY OF THE INVENTION

In view of the above analysis, the embodiments of the present invention are to provide a method, system and terminal for communication between an encryption terminal and an encryption module in a cluster system, to at least solve the problem that the synchronization of working states between an encryption terminal and an encryption module cannot be well implemented in the related art.

The object of the embodiments of the present invention is mainly implemented through the following technical scheme.

A method for communication between an encryption terminal and an encryption module in a cluster system comprises the following steps:

when it is required to make an encrypted call, a calling encryption terminal applying to a key management center for a key according to the type of the encrypted call;

the calling encryption terminal and a called encryption terminal receiving working keys sent from the key management center to the calling encryption terminal and the called encryption terminal, setting respective working states, and synchronizing the working keys and the working states to respective encryption modules;

the encryption module of the calling encryption terminal and the encryption module of the called encryption terminal respectively making an encrypted call by using the working keys.

Preferably, when the type of the encrypted call is an encrypted single call or an encrypted group call, the calling encryption terminal applies to the key management center for the key through the cluster system, and a synchronization process specifically comprises:

according to an encryption request sent from the calling encryption terminal, the cluster system requesting the key management center to perform authentication on the calling encryption terminal and the called encryption terminal;

when it is determined that the authentication is passed, the cluster system allocating the working keys sent from the key management center to the calling encryption terminal and the called encryption terminal;

the calling encryption terminal and the called encryption terminal synchronizing the working keys and the working states to the encryption modules.

Preferably, the method further comprises: when applying to the key management center for the key through the cluster system, the calling encryption terminal sending the type of the encrypted call to the cluster system;

the cluster system receiving the type of the encrypted call sent from the calling encryption terminal, besides allocating the keys to the calling encryption terminal and the called encryption terminal, allocating a speaking right to the calling encryption terminal, and allocating speaking rights to other encryption terminals in the process of an encrypted call according to requirements, and releasing the speaking right after the encrypted call ends.

Preferably, the working states comprise an idle state, a listening state and a speaking state.

Preferably, in the state of an encrypted call, when all encryption terminals are in the idle states and have no speaking right, if an encryption terminal applies for a speaking right, the cluster system allocates the speaking right to the encryption terminal;

the encryption terminal obtaining the speaking right switches from an original idle state to the speaking state, and synchronizes state switching to its own encryption module; other encryption modules switch from an original idle state to the listening state, and synchronize state switching to respective encryption modules;

when ending the call and releasing the speaking right, the encryption terminal obtaining the speaking right switches from an original speaking state to the idle state, and synchronizes state switching to its own encryption module, and the cluster system notifies other encryption terminals; the other encryption terminals switch from original listening states to the idle states, and synchronize state switching to respective encryption modules.

Preferably, the step of the encryption module of the calling encryption terminal and the encryption module of the called encryption terminal respectively making an encrypted call by using the working keys is specifically:

when the calling encryption terminal or the called encryption terminal serves as a speaking party, an encryption module of an encryption terminal serving as the speaking party encrypting voice data and then performing transmission; and an encryption module of an encryption terminal serving as a listening party decrypting received voice data.

The embodiment of the present invention further provides a system for communication between an encryption terminal and an encryption module in a cluster system, which comprises:

a calling encryption terminal, configured to: when it is required to make an encrypted call, apply to a key management center for a key according to the type of the encrypted call, and receive a working key sent from the key management center to the calling encryption terminal, set its working state, and synchronize the working key and the working state to an encryption module, and make an encrypted call with a called encryption terminal;

the called encryption terminal, configured to: receive a working key sent from the key management center to the called encryption terminal, set its working state, and synchronize the working key and the working state to an encryption module, and make a call with the calling encryption terminal;

the key management center, configured to: allocate the working keys to the calling encryption terminal and the called encryption terminal.

Preferably, a cluster system is configured to: according to an encryption request sent from the calling encryption terminal, request the key management center to perform authentication on the calling encryption terminal and the called encryption terminal; and when it is determined that the authentication is passed, allocate the working keys sent from the key management center to the calling encryption terminal and the called encryption terminal.

Preferably, when the calling encryption terminal applies to the key management center for the key through the cluster system, and sends the type of the encrypted call to the cluster system, the cluster system is further configured to: receive the type of the encrypted call sent from the calling encryption terminal, besides allocating the keys to the calling encryption terminal and the called encryption terminal, allocate a speaking right to the calling encryption terminal, and allocate speaking rights to other encryption terminals in the process of an encrypted call according to requirements, and release the speaking right after the encrypted call ends.

The embodiment of the present invention further provides a terminal, which comprises:

an applying module, configured to: apply to a key management center for a key according to the type of an encrypted call;

a synchronization module, configured to: receive a working key sent from the key management center, set a working state of the terminal, and synchronize the working key and the working state to an encryption module;

the encryption module, configured to: make an encrypted call by using the working key.

The beneficial effects of the present document are described as follows.

With the method, system and terminal for communication between the encryption terminal and the encryption module in the cluster system provided in the embodiments of the present invention, when it is required to make an encrypted call, a calling encryption terminal applies to a key management center for a key according to the type of the encrypted call; the calling encryption terminal and a called encryption terminal receive working keys sent from the key management center to the calling encryption terminal and the called encryption terminal, set respective working states, and synchronize the working keys and the working states to encryption modules; and the encryption module of the calling encryption terminal and the encryption module of the called encryption terminal respectively make an encrypted call by using the working keys, which can well implement the synchronization of the working keys, working states and type of the encrypted call between the encryption terminal and the encryption module in the cluster system, and effectively guarantee the security of the encrypted call.

Other characteristics and advantages of the embodiments of the present invention will be elaborated in the following descriptions, and they will be partially apparent in the descriptions or be known by implementing the patent document. The object and other advantages of the embodiments of the present invention can be implemented and obtained through the structures particularly pointed out in the written descriptions, claims and accompanying drawings.

PREFERRED EMBODIMENTS OF THE INVENTION

The preferred embodiments of the present invention will be specifically described in combination with the accompanying drawings below, wherein the accompanying drawings constitute a part of the invention patent document , and they are used for explaining the principle of the patent document, with the embodiments of the present invention.

Embodiment 1

Figure 1:
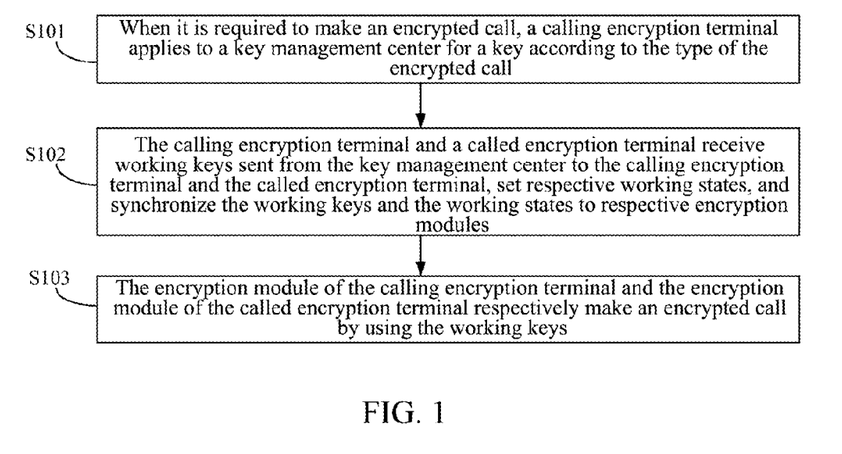
FIG. 1 is a flow chart of a method for communication between an encryption terminal and an encryption module in a cluster system according to the embodiment 1 of the present invention.

The embodiment of the present invention provides a method for communication between an encryption terminal and an encryption module in a cluster system, and with reference to FIG. 1, the method includes the following steps.

In step S101, when it is required to make an encrypted call, a calling encryption terminal applies to a key management center for a key according to the type of an encrypted call.

The type of the encrypted call is a voice call, an encrypted single call or an encrypted group call.

In step S102, the calling encryption terminal and a called encryption terminal receive working keys sent from the key management center to the calling encryption terminal and the called encryption terminal, set respective working states, and synchronize the working keys and the working states to respective encryption modules.

The working states include an idle state, a listening state and a speaking state.

In step S103, the encryption module of the calling encryption terminal and the encryption module of the called encryption terminal respectively make an encrypted call by using the working keys.

As a preferred embodiment of the embodiments of the present invention, when the calling encryption terminal or the called encryption terminal serves as a speaking party, an encryption module of an encryption terminal serving as the speaking party encrypts voice data and then performs transmission; and an encryption module of an encryption terminal serving as a listening party decrypts the received voice data.

With an method for communication between the encryption terminal and the encryption module in the cluster system provided in the embodiment of the present invention, the synchronization of the working keys, working states and type of the encrypted call between the encryption terminal and the encryption module in the cluster system can be well implemented, which effectively guarantees the security of the encrypted call.

Embodiment 2

Figure 2:
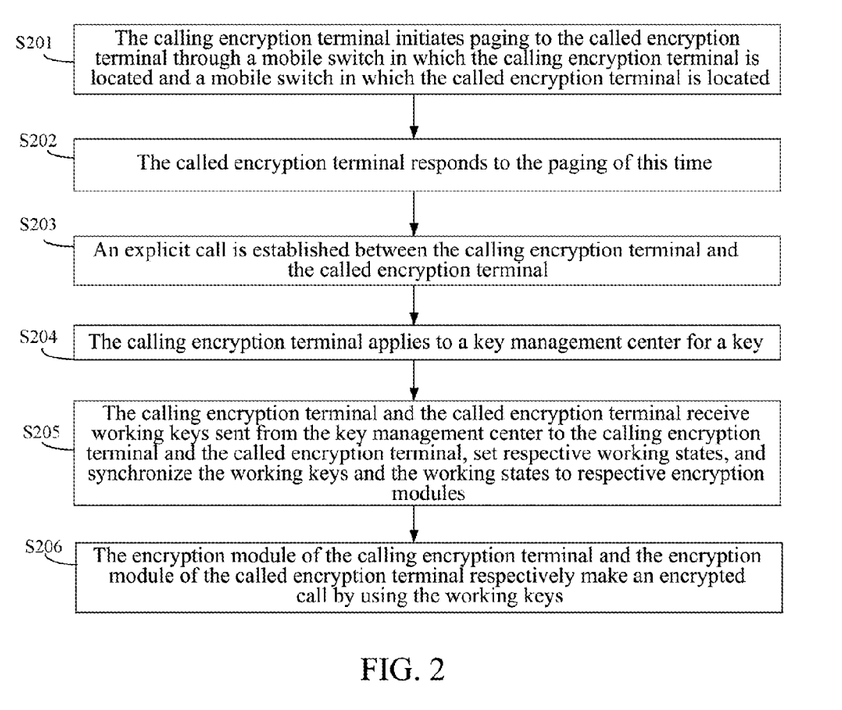
FIG. 2 is a flow chart of a method for communication between an encryption terminal and an encryption module in a voice call according to the embodiment 2 of the present invention.

With reference to FIG. 2, a method for communication between an encryption terminal and an encryption module in a voice call in the cluster system provided in the embodiment of the present invention includes the following steps.

In step S201, the calling encryption terminal initiates paging to a called encryption terminal through a mobile switch in which the calling encryption terminal is located and a mobile switch in which the called encryption terminal is located.

In step S202, the called encryption terminal responds to the paging of this time.

In step S203, an explicit call is established between the calling encryption terminal and the called encryption terminal.

In step S204, the calling encryption terminal applies to a key management center for a key.

In step S205, the calling encryption terminal and the called encryption terminal receive working keys sent from the key management center to the calling encryption terminal and the called encryption terminal, set respective working states, and synchronize the working keys and the working states to respective encryption modules.

In step S206, the encryption module of the calling encryption terminal and the encryption module of the called encryption terminal respectively make an encrypted call by using the working keys.

With the method for communication between the encryption terminal and the encryption module in the voice call in the cluster system provided in the embodiment of the present invention, the synchronization between the encryption terminal and the encryption module can be well implemented, and the calling encryption terminal and the called encryption terminal synchronize the working keys, working states and type of the encrypted call to the encryption modules, which effectively guarantees the security of the call.

Embodiment 3

Figure 3:
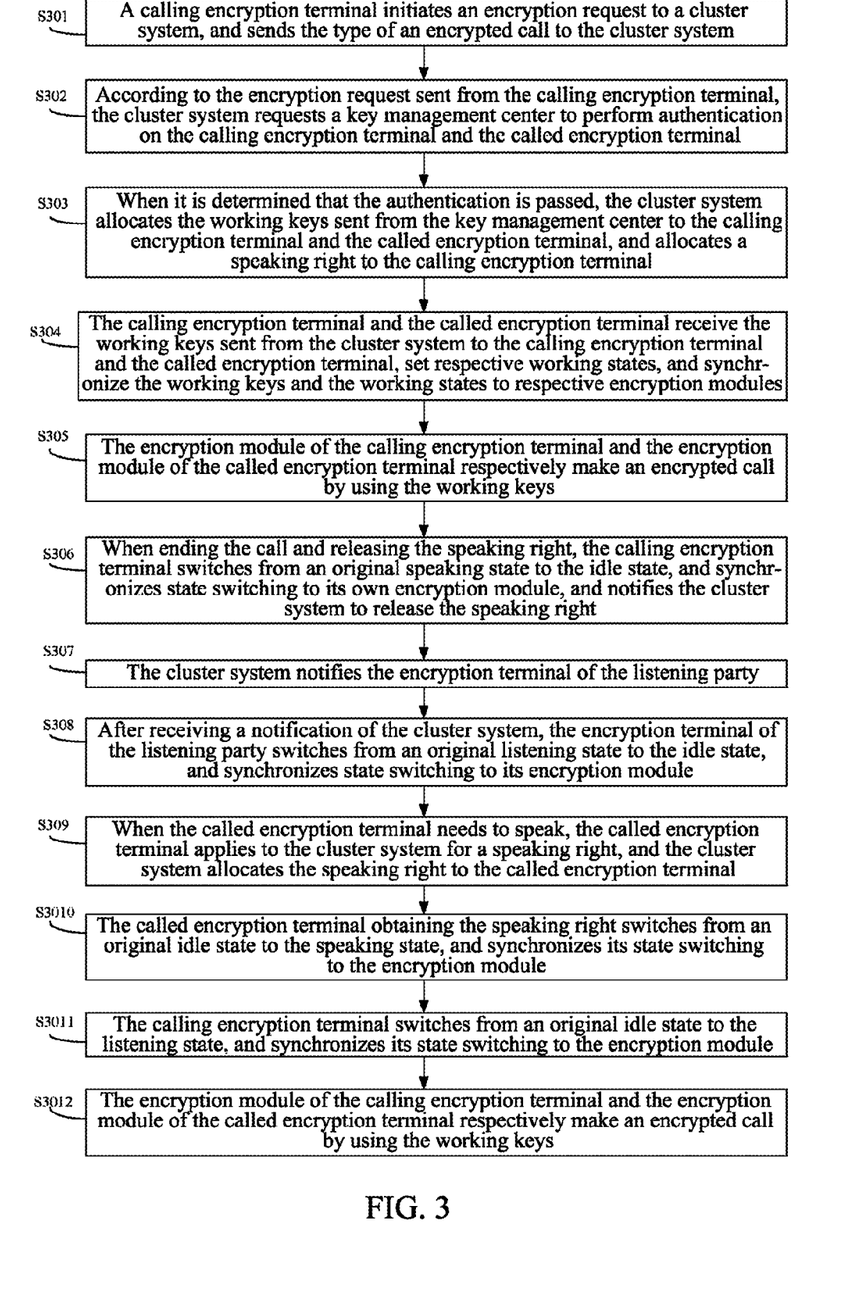
FIG. 3 is a flow chart of a method for communication between an encryption terminal and an encryption module in an encrypted single call according to the embodiment 3 of the present invention.

With reference to FIG. 3, a method for communication between an encryption terminal and an encryption module in an encrypted single call provided in the embodiment of the present invention includes the following steps.

In step S301, a calling encryption terminal initiates an encryption request to a cluster system, and sends the type of an encrypted call to the cluster system.

In step S302, according to the encryption request sent from the calling encryption terminal, the cluster system requests a key management center to perform authentication on the calling encryption terminal and a called encryption terminal.

The key management center performs authentication on the calling encryption terminal and the called encryption terminal, so as to guarantee that both the calling encryption terminal and the called encryption terminal meet the requirements of the encrypted call, thereby guaranteeing the security of the encrypted call.

In step S303, when it is determined that the authentication is passed, the cluster system allocates working keys sent from the key management center to the calling encryption terminal and the called encryption terminal, and allocates a speaking right to the calling encryption terminal.

In step S304, the calling encryption terminal and the called encryption terminal receive the working keys sent from the cluster system to the calling encryption terminal and the called encryption terminal, set respective working states, and synchronize the working keys and the working states to respective encryption modules;

wherein the working states include an idle state, a listening state and a speaking state.

In step S305, the encryption module of the calling encryption terminal and the encryption module of the called encryption terminal respectively make an encrypted call by using the working keys.

An encryption module of an encryption terminal serving as a speaking party encrypts voice data and then performs transmission; and an encryption module of an encryption terminal serving as a listening party decrypts the received voice data.

In step S306, when ending the call and releasing the speaking right, the calling encryption terminal switches from an original speaking state to the idle state, and synchronizes state switching to its own encryption module, and notifies the cluster system to release the speaking right.

In step S307, the cluster system notifies the encryption terminal of the listening party.

In step S308, after receiving a notification of the cluster system, the encryption terminal of the listening party switches from an original listening state to the idle state, and synchronizes state switching to its encryption module.

In step S309, when the called encryption terminal needs to speak, the called encryption terminal applies to the cluster system for a speaking right, and the cluster system allocates the speaking right to the called encryption terminal.

In step S3010, the called encryption terminal obtaining the speaking right switches from an original idle state to the speaking state, and synchronizes its state switching to the encryption module.

In step S3011, the calling encryption terminal switches from an original idle state to the listening state, and synchronizes its state switching to the encryption module.

In step S3012, the encryption module of the calling encryption terminal and the encryption module of the called encryption terminal respectively make an encrypted call by using the working keys.

After the encrypted call is completed, the encryption terminal obtaining the speaking right last releases the speaking right, synchronizes its working state to the encryption module, and notifies the encryption terminal of the listening party through the cluster system, the encryption terminal of the listening party switches from an original listening state to the idle state after receiving the notification of the cluster system, and synchronizes state switching to its encryption module, and the encrypted call ends.

With the method for communication between the encryption terminal and the encryption module in the encrypted single call provided in the embodiment of the present invention, the synchronization between the encryption terminal and the encryption module during the encrypted call, speaking right handover and speaking right release can be well implemented, and the calling encryption terminal and the called encryption terminal synchronize the working keys, working states and type of the encrypted call to the encryption modules, which can effectively guarantee the security of the call. Moreover, before performing the encrypted call, the key management center is required to perform authentication on the calling encryption terminal and the called encryption terminal, so as to guarantee that both the calling encryption terminal and the called encryption terminal meet requirements of the encrypted call, thereby guaranteeing security of the encrypted call.

Embodiment 4

Figure 4:
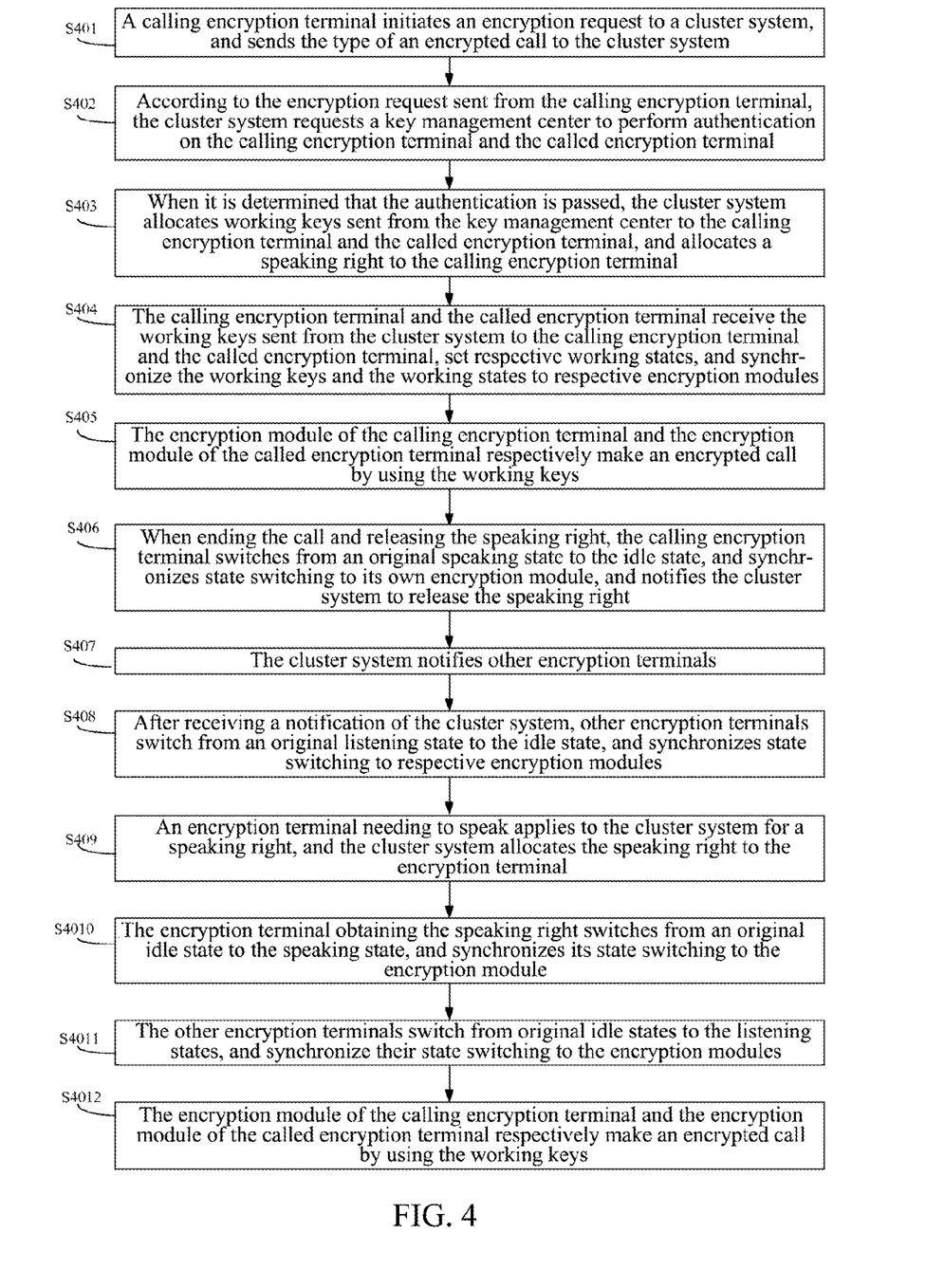
FIG. 4 is a flow chart of a method for communication between an encryption terminal and an encryption module in an encrypted group call according to the embodiment 4 of the present invention.

With reference to FIG. 4, a method for communication between an encryption terminal and an encryption module in an encrypted group call in the cluster system provided in the embodiment of the present invention includes the following steps.

In step S401, a calling encryption terminal initiates an encryption request to a cluster system, and sends the type of an encrypted call to the cluster system.

In step S402, according to the encryption request sent from the calling encryption terminal, the cluster system requests a key management center to perform authentication on the calling encryption terminal and a called encryption terminal.

The key management center performs authentication on the calling encryption terminal and the called encryption terminal, so as to guarantee that both the calling encryption terminal and the called encryption terminal meet requirements of the encrypted call, thereby guaranteeing security of the encrypted call.

In step S403, when it is determined that the authentication is passed, the cluster system allocates working keys sent from the key management center to the calling encryption terminal and the called encryption terminal, and allocates a speaking right to the calling encryption terminal.

In step S404, the calling encryption terminal and the called encryption terminal receive the working keys sent from the cluster system to the calling encryption terminal and the called encryption terminal, set respective working states, and synchronize the working keys and the working states to respective encryption modules;

wherein the working states include an idle state, a listening state and a speaking state.

In step S405, the encryption module of the calling encryption terminal and the encryption module of the called encryption terminal respectively make an encrypted call by using the working keys.

An encryption module of an encryption terminal serving as a speaking party encrypts voice data and then performs transmission; and an encryption module of an encryption terminal serving as a listening party decrypts the received voice data.

In step S406, when ending the call and releasing the speaking right, the calling encryption terminal switches from an original speaking state to the idle state, and synchronizes state switching to its own encryption module, and notifies the cluster system to release the speaking right.

In step S407, the cluster system notifies other called encryption terminals.

In step S408, after receiving a notification of the cluster system, other called encryption terminals switch from an original listening state to the idle state, and synchronizes state switching to respective encryption modules.

In step S409, an encryption terminal needing to speak applies to the cluster system for a speaking right, and the cluster system allocates the speaking right to the encryption terminal.

In step S4010, the encryption terminal obtaining the speaking right switches from an original idle state to the speaking state, and synchronizes its state switching to the encryption module.

In step S4011, other encryption terminals switch from an original idle state to the listening state, and synchronize their state switching to the encryption modules.

In step S4012, the encryption module of the calling encryption terminal and the encryption module of the called encryption terminal respectively make an encrypted call by using the working keys.

After the encrypted call is completed, the encryption terminal obtaining the speaking right releases the speaking right, synchronizes its working state to the encryption module, and notifies the encryption terminal of the listening party through the cluster system, the encryption terminal of the listening party switches from an original listening state to the idle state after receiving the notification of the cluster system, and synchronizes state switching to its encryption module, and the encrypted call ends.

With the method for communication between the encryption terminal and the encryption module in the encrypted group call provided in the embodiment of the present invention, the synchronization between the encryption terminal and the encryption module during the encrypted call, speaking right handover and speaking right release can be well implemented, and the calling encryption terminal and the called encryption terminal synchronize the working keys, working states and type of the encrypted call to the encryption modules, which can effectively guarantee security of the call. Moreover, before performing the encrypted call, the key management center is required to perform authentication on the calling encryption terminal and the called encryption terminal, so as to guarantee that both the calling encryption terminal and the called encryption terminal meet requirements of the encrypted call, thereby guaranteeing security of the encrypted call.

With regard to a specific implementation process of the method, since detailed descriptions will be made in the following system and terminal, it will not be repeated here.

Embodiment 5

Figure 5:
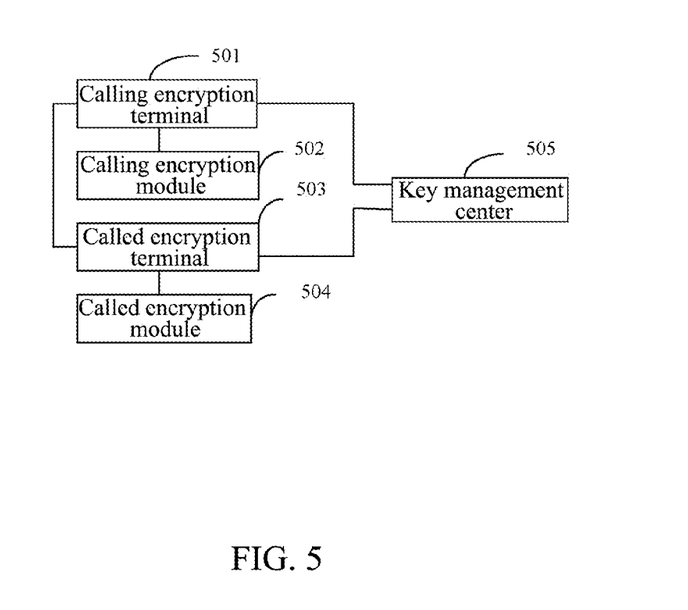
FIG. 5 is a schematic diagram of a system for communication between an encryption terminal and an encryption module in a cluster system according to the embodiment 5 of the present invention.

The embodiment of the present invention provides a system for communication between an encryption terminal and an encryption module in a cluster system, and with reference to FIG. 5, the system includes:

a calling encryption terminal 501, configured to: when it is required to make an encrypted call, apply to a key management center for a key according to the type of the encrypted call, and receive a working key sent from the key management center to the calling encryption terminal, set its working state, and synchronize the working key and the working state to a calling encryption module 502, and make an encrypted call with a called encryption terminal;

a called encryption terminal 503, configured to: receive a working key sent from the key management center to the called encryption terminal, set its working state, and synchronize the working key and the working state to a called encryption module 504, and make a call with the calling encryption terminal 501; and a key management center 505, configured to: allocate the working keys to the calling encryption terminal 501 and the called encryption terminal 503.

With a system for communication between the encryption terminal and the encryption module in the cluster system provided in the embodiment of the present invention, the synchronization of the working keys, working states and type of the encrypted call between the encryption terminal and the encryption module in the cluster system can be well implemented, which effectively guarantees security of the encrypted call.

Embodiment 6

Figure 6:
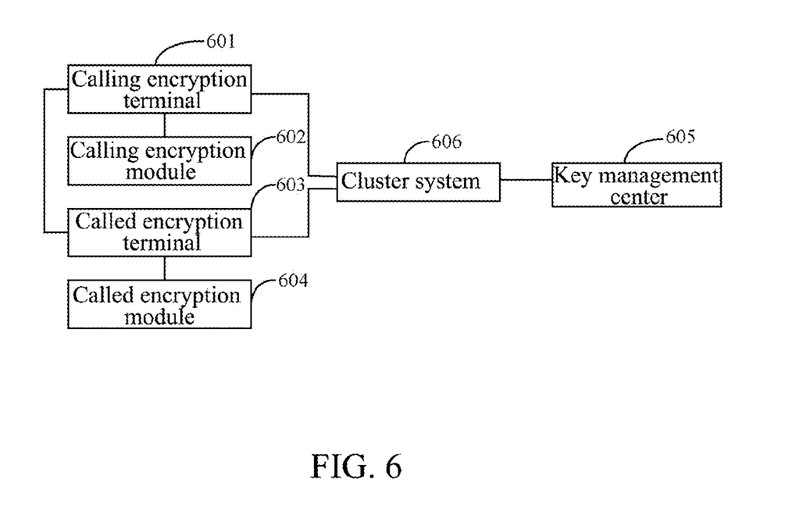
FIG. 6 is a schematic diagram of a system for communication between an encryption terminal and an encryption module in a cluster system according to the embodiment 6 of the present invention.

The embodiment of the present invention provides a system for communication between an encryption terminal and an encryption module in a cluster system, and with reference to FIG. 6, the system includes:

a calling encryption terminal 601, configured to: when it is required to make an encrypted call, apply to a key management center for a key according to the type of the encrypted call, and receive a working key sent from the key management center to the calling encryption terminal, set its working state, and synchronize the working key and the working state to a calling encryption module 602, and make an encrypted call with a called encryption terminal;

a called encryption terminal 603, configured to: receive a working key sent from the key management center to the called encryption terminal, set its working state, and synchronize the working key and the working state to a called encryption module 604, and make a call with the calling encryption terminal 601;

a key management center 605, configured to: allocate the working keys to the calling encryption terminal 601 and the called encryption terminal 603.

A cluster system 606 is configured to: according to an encryption request sent from the calling encryption terminal 601, request the key management center 605 to perform authentication on the calling encryption terminal 601 and the called encryption terminal 603; and when it is determined that the authentication is passed, allocate the working keys sent from the key management center 605 to the calling encryption terminal 601 and the called encryption terminal 603.

When the calling encryption terminal 601 applies to the key management center 605 for the key through the cluster system 606 and sends the type of the encrypted call to the cluster system 606, the cluster system 606 is further configured to: receive the type of the encrypted call sent from the calling encryption terminal 601, besides allocating the keys to the calling encryption terminal 601 and the called encryption terminal 603, allocate a speaking right to the calling encryption terminal 601, and allocate speaking rights to other encryption terminals in the process of an encrypted call according to requirements, and release the speaking right after the encrypted call ends.

With regard to a specific implementation process of the system, since detailed descriptions have been made in the above method and terminal, it will not be repeated here.

Embodiment 7

Figure 7:
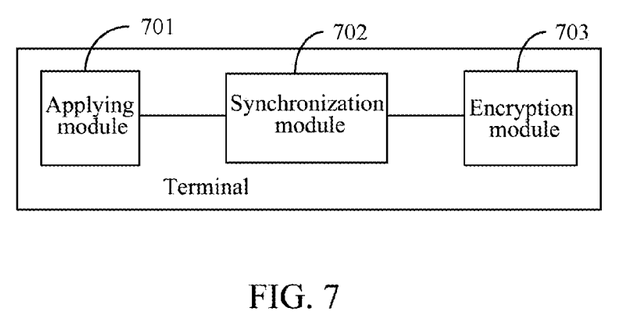
FIG. 7 is a schematic diagram of a structure of a terminal according to the embodiment 7 of the present invention.

The embodiment of the present invention also provides a terminal, and with reference to FIG. 7, the terminal includes:

an applying module 701, configured to: apply to a key management center for a key according to the type of an encrypted call;

a synchronization module 702, configured to: receive a working key sent from the key management center, set a working state of the terminal, and synchronize the working key and the working state to an encryption module;

an encryption module 703, configured to: make an encrypted call by using the working key.

Synchronization of the working keys, working states and type of the encrypted can be well implemented between a terminal provided in the embodiment of the present invention and the encryption module, which effectively guarantees security of the encrypted call.

With regard to a specific implementation process of the terminal, since detailed descriptions have been made in the above method and system, it will not be repeated here.

In conclusion, with the method, system and terminal for communication between the encryption terminal and the encryption module in the cluster system provided in the embodiment of the present invention, at least one of the following beneficial effects can be brought.

1. With the method, system and terminal for communication between the encryption terminal and the encryption module in the cluster system provided in the embodiments of the present invention, when it is required to make an encrypted call, a calling encryption terminal notifies a called encryption terminal of a working state and the type of the encrypted call, and applies to a key management center for a key, and the calling encryption terminal and the called encryption terminal receive working keys sent from the key management center to the calling encryption terminal and the called encryption terminal, and respectively synchronize the working keys, working states and type of the encrypted call to encryption modules; and the calling encryption terminal and the called encryption terminal enter the encrypted call, which can well implement synchronization of the working keys, working states and type of the encrypted call between the encryption terminal and the encryption module in the cluster system and effectively guarantee security of the encrypted call.

2. In the method, system and terminal for communication between the encryption terminal and the encryption module in the cluster system provided in the embodiments of the present invention, the calling encryption terminal and the called encryption terminal in the encrypted group call and the encrypted single call both need to be authenticated by the key management center, if the authentication on the calling encryption terminal and the called encryption terminal is passed, the encrypted call is made, and if the authentication on the calling encryption terminal or the called encryption terminal is not passed, the program ends, thus such authentication system guarantees the security of the encrypted call.

The above description is only the preferred specific embodiments of the present invention, but the protection scope of the present document is not limited herein, changes or substitutions that can be easily conceived by any skilled person familiar to the art within the technical scope disclosed by the present document shall be all covered within the protection scope of the present document. Therefore, the protection scope of the present document should be subjected to the protection scope of the claims.

INDUSTRIAL APPLICABILITY

With the method, system and terminal for communication between the encryption terminal and the encryption module in the cluster system provided in the embodiments of the present invention, when it is required to make an encrypted call, a calling encryption terminal notifies a called encryption terminal of a working state and the type of the encrypted call, and applies to a key management center for a key, and the calling encryption terminal and the called encryption terminal receive working keys sent from the key management center to the calling encryption terminal and the called encryption terminal and respectively synchronize the working keys, working states and type of the encrypted call to encryption modules; and the calling encryption terminal and the called encryption terminal enter the encrypted call, which can well implement synchronization of the working keys, working states and type of the encrypted call between the encryption terminal and the encryption module in the cluster system and effectively guarantee security of the encrypted call.

Moreover, the calling encryption terminal and the called encryption terminal in the encrypted group call and the encrypted single call both need to be authenticated by the key management center, if the authentication on the calling encryption terminal and the called encryption terminal is passed, the encrypted call is made, and if the authentication on the calling encryption terminal or the called encryption terminal is not passed, the program ends, thus such authentication system guarantees the security of the encrypted call.

What is claimed is:

1. A method for communication between an encryption terminal and an encryption module in a cluster system, comprising the following steps:
   when required to make an encrypted call, a calling encryption terminal applying to a key management center for a key according to a type of the encrypted call;
   the calling encryption terminal and a called encryption terminal receiving working keys sent from the key management center to the calling encryption terminal and the called encryption terminal, setting respective working states, and synchronizing the working keys and the working states to respective encryption modules; and
   the encryption module of the calling encryption terminal and the encryption module of the called encryption terminal respectively making an encrypted call by using the working keys;
   wherein the working states comprise an idle state, a listening state and a speaking state,
   setting respective working states, and synchronizing the working keys and the working states to respective encryption modules comprises:
      the calling encryption terminal setting its working state as the speaking state and synchronizing the speaking state to its encryption module,
      the called encryption terminal setting its working state as the listening state and synchronizing the listening state to its encryption module,
      the encryption module of the calling encryption terminal and the encryption module of the called encryption terminal respectively making an encrypted call by using the working keys comprises:
         after the speaking state is synchronized, the encryption module of the calling encryption terminal encrypting voice data and then performing transmission;
         after the listening state is synchronized, the encryption module of the called encryption terminal decrypting received voice data.

2. The communication method according to claim 1, wherein when the type of the encrypted call is an encrypted single call or an encrypted group call, the calling encryption terminal applies to the key management center for the key through the cluster system, and a synchronization process specifically comprises:
   according to an encryption request sent from the calling encryption terminal, the cluster system requesting the key management center to perform authentication on the calling encryption terminal and the called encryption terminal;
   when it is determined that the authentication is passed, the cluster system allocating the working keys sent from the key management center to the calling encryption terminal and the called encryption terminal; and
   the calling encryption terminal and the called encryption terminal synchronizing the working keys and the working states to the encryption modules.

3. The communication method according to claim 2, further comprising:
   when applying to the key management center for the key through the cluster system, the calling encryption terminal sending the type of the encrypted call to the cluster system; and
   the cluster system receiving the type of the encrypted call sent from the calling encryption terminal, besides allocating keys to the calling encryption terminal and the called encryption terminal, allocating a speaking right to the calling encryption terminal, and allocating speaking rights to other encryption terminals in a process of an encrypted call according to requirements, and releasing the speaking right after the encrypted call ends.

4. The communication method according to claim 1, further comprising:
   in a state of an encrypted call, when all encryption terminals are in the idle states and have no speaking right, if an encryption terminal applies for a speaking right, the cluster system allocating the speaking right to the encryption terminal;
   the encryption terminal obtaining the speaking right switching from an original idle state to the speaking state, and synchronizing state switching to own encryption module; other encryption modules switching from original idle states to the listening states, and synchronizing state switching to respective encryption modules; and
   when ending a call and releasing the speaking right, the encryption terminal obtaining the speaking right switching from an original speaking state to the idle state, and synchronizing state switching to own encryption module, and the cluster system notifying the other encryption terminals; the other encryption terminals switching from original listening states to the idle states, and synchronizing state switching to respective encryption modules.

5. A system for communication between an encryption terminal and an encryption module in a cluster system, comprising:
   a calling encryption terminal, configured to: when required to make an encrypted call, apply to a key management center for a key according to a type of the encrypted call, and receive a working key sent from the key management center to the calling encryption terminal, set a working state of the calling encryption terminal, and synchronize the working key and the working state to an encryption module, and when the working state is a speaking state and is synchronized to the encryption module, encrypt voice data by the encryption module and then transmit to a called encryption terminal;

the called encryption terminal, configured to: receive a working key sent from the key management center to the called encryption terminal, set a working state of the called encryption terminal, and synchronize the working key and the working state to its encryption module, and when the working state is a listening state and is synchronized to the encryption module, decrypt received voice data from the calling encryption terminal through the encryption module of the called encryption terminal; and the key management center, configured to: allocate the working keys to the calling encryption terminal and the called encryption terminal.

6. The communication system according to claim 5, further comprising:

a cluster system, configured to: according to an encryption request sent from the calling encryption terminal, request the key management center to perform authentication on the calling encryption terminal and the called encryption terminal; and when that the authentication is passed is determined, allocate the working keys sent from the key management center to the calling encryption terminal and the called encryption terminal.

7. The communication system according to claim 5, wherein when the calling encryption terminal applies to the key management center for the key through the cluster system, and sends the type of the encrypted call to the cluster system, the cluster system is further configured to: receive the type of the encrypted call sent from the calling encryption terminal, allocate a speaking right to the calling encryption terminal, allocate speaking rights to other encryption terminals in a process of an encrypted call according to requirements, and release the speaking right after the encrypted call ends.

8. A terminal, comprising:

an applying module, configured to: apply to a key management center for a key according to a type of an encrypted call;

a synchronization module, configured to: receive a working key sent from the key management center, set a working state of the terminal, and synchronize the working key and the working state to an encryption module; and the encryption module, configured to: make an encrypted call by using the working key;

the encryption module is further configured to: when the working state is a speaking state and is synchronized by the synchronization module, encrypt voice data and then perform transmission; when the working state is a listening state and is synchronized by the synchronization module, decrypt received voice data.

\* \* \* \* \*